United States Patent [19] [11] 4,375,040

Sauerwein [45] Feb. 22, 1983

[54] BRUSH HOLDER ASSEMBLY

[75] Inventor: William D. Sauerwein, Westminster, Md.

[73] Assignee: Black & Decker Inc., Newark, Del.

[21] Appl. No.: 292,435

[22] Filed: Aug. 14, 1981

[51] Int. Cl.[3] .......... H02K 13/00

[52] U.S. Cl. .......... 310/239; 310/242; 310/245

[58] Field of Search .......... 310/238-247, 310/249, 71, 42, 43

[56] References Cited

U.S. PATENT DOCUMENTS

| | | | |
|---|---|---|---|
| 2,448,850 | 9/1948 | Weber | 310/247 |
| 2,449,764 | 9/1948 | Bluemink | 310/247 |
| 3,290,524 | 12/1966 | Maffey | 310/239 |
| 3,308,321 | 3/1967 | Provost | 310/239 |
| 3,349,266 | 10/1967 | Jepson et al. | 310/247 |
| 3,849,684 | 11/1974 | Duncan et al. | 310/242 |
| 3,898,493 | 8/1975 | Schaffer | 310/239 |
| 3,911,304 | 10/1975 | Seely | 310/242 |
| 3,967,148 | 6/1976 | Walsh | 310/239 |
| 4,250,613 | 2/1981 | Sauerwein | 310/239 |
| 4,293,789 | 10/1981 | King | 310/239 |

*Primary Examiner*—R. Skudy

*Attorney, Agent, or Firm*—Ronald B. Sherer; Harold Weinstein; Charles E. Yocum

[57] ABSTRACT

A brush holder assembly has a body portion with a through opening and an externally accessible lateral opening communicating with the through opening and forming an internal shoulder within the body portion. A brush insert is slidably received within the through opening of the body portion and has an integral connection tab received within the lateral opening. The tab is bent over the shoulder to preclude axial withdrawal of the insert in one direction away from the body. A brush lead has a quick-connection terminal slidably received over the tab to make electrical connection to the insert within the lateral opening of the body. A brush is slidably received within the insert and extends beyond one end of the insert to engage a commutator. The other end of the insert is covered by a shunt cap, and a shunt is disposed between the shunt cap and the brush. A removable brush cap is secured to the outer end of the body, and a conical spring is disposed between the shunt cap and the brush cap. The enlarged end of the conical spring is seated within a blind axial bore in the brush cap, and the center of the spring bears against the shunt cap.

3 Claims, 10 Drawing Figures

10
11
12
13
14
15
16
23
2

16
17
18
19
20
21
22
23
26
44

17
24
25
26
27
28
29
30
5

21
25
26
28
29
30

17
19
21
26
28
30

40
41
43

7
17
18
21
28
31
34
35
37

16
18
31
32
33
34
35
36
37

30
31
32
33
37
38
39
40
42
43

28
30
31
32
41
42

BRUSH HOLDER ASSEMBLY

BACKGROUND OF THE INVENTION

Brush holder assemblies have been designed to accommodate vibratory loads and other highly-stressed applications found in portable electric impact wrenches and other electrical tools and devices intended for industrial applications. The prior art brush holder assemblies have tended to become somewhat cumbersome, difficult to assemble and to service, and hence expensive.

It is an object of the present invention to provide a brush holder assembly which will resist mechanical loads and vibration, yet can be assembled and serviced easily, thus improving overall reliability while reducing costs.

It is another object of the present invention to provide a brush holder assembly which has an integral connection tab that is confined within a lateral opening of the body portion of the assembly, and which facilitates electrical connection to a quick-connect push-on terminal carried by the brush lead, thereby simplifying the assembly operation and tending to protect against dirt and contaminants.

It is yet another object of the present invention to provide a conical spring between the shunt cap and the brush cap, the enlarged end coil portion of the spring being seated within a blind axial bore in the brush cap, and the center of the spring bearing against the shunt cap, thereby tending to minimize turning movement of the shunt cap as the brush cap is threaded into the body portion of the brush holder.

It is a further object of the present invention to use a simple round disk for the shunt cap, thereby eliminating the necessity for ears and reducing overall costs.

These and other objects of the present invention will become apparent from a reading of the following specification, taken in conjunction with the drawings.

DETAILED DESCRIPTION

Figures 1, 2, 3, 4, 5, 6, 7, 8, 9, 10:
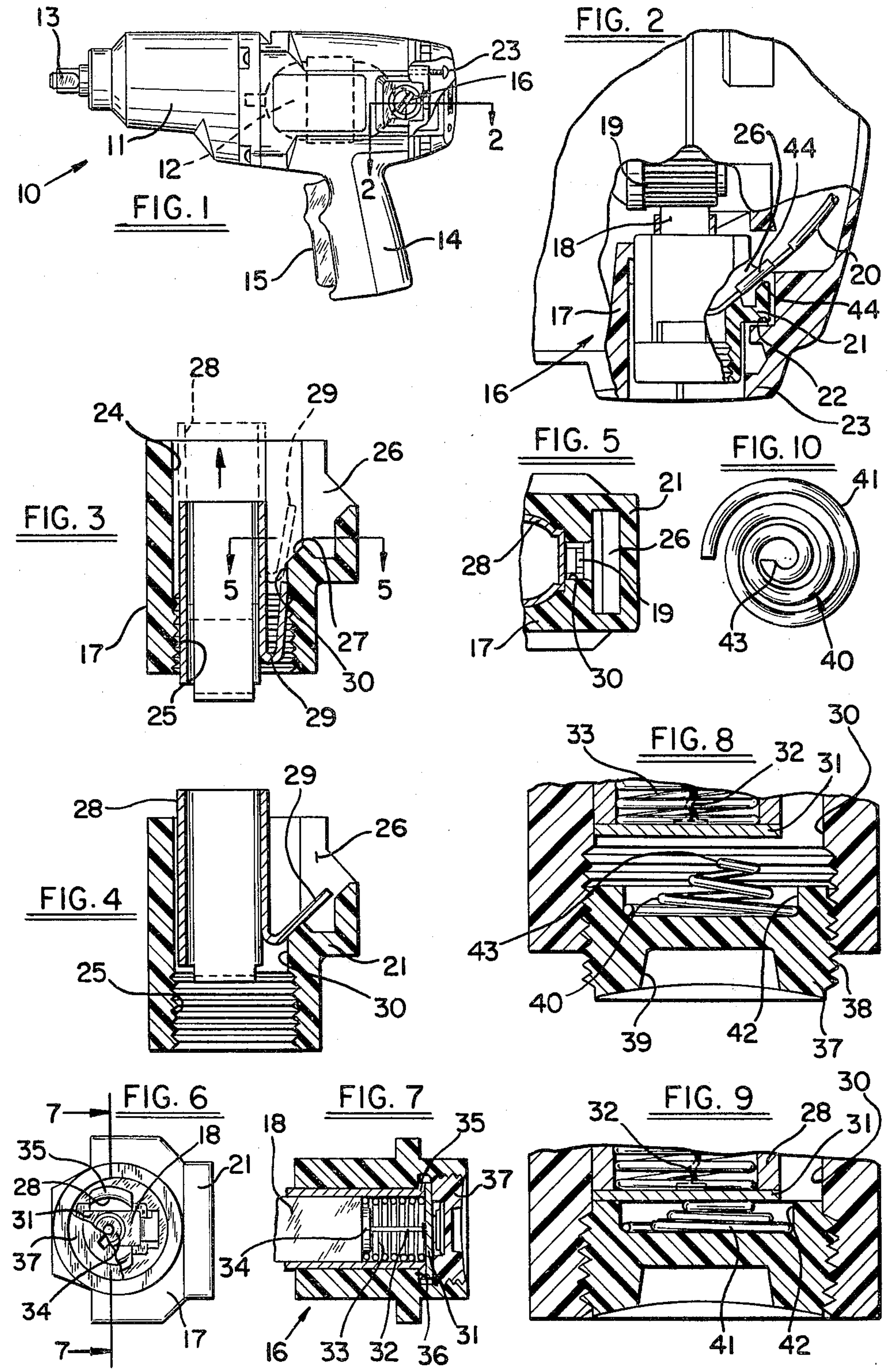
FIG. 1 is a side elevation of an electric impact wrench within which the brush holder assembly of the present invention may find particular utility.
FIG. 2 is an enlarged cut-away drawing of a portion of the wrench, taken along the lines 2—2 of FIG. 1 and partly in plan and partly in section, showing the brush holder assembly in greater detail.
FIG. 3 shows the manner in which the brush insert is slidably received within the body portion of the brush holder assembly.

FIG. 4 corresponds to FIG. 3, but shows the manner in which the integral connection tab of the insert is bent over an internal shoulder of the body, thereby precluding axial withdrawal of the insert from the body in a direction away from the tool;

FIG. 5 is a partial section view, taken along the lines 5—5 of FIG. 3;

FIG. 6 is a top plan view of the brush holder assembly;

FIG. 7 is a longitudinal section of the brush holder assembly, taken along the lines 7—7 of FIG. 6;

FIG. 8 is an enlarged fragmentary longitudinal section of the brush holder assembly, showing the manner in which the brush cap is threadably secured to the body;

FIG. 9 corresponds to FIG. 8, but shows the brush cap fully seated within the body; and FIG. 10 is a plan view of the conical spring lodged between the brush cap and the shunt cap.

With reference to FIG. 1, there is illustrated a portable electric impact wrench 10 within which the present invention may find particular utility. It will be understood by those skilled in the art, however, that the wrench 10 is only illustrative of one application of the present invention, and that the teachings of the invention are equally applicable to a wide variety of tools, appliances and electrical devices.

With this in mind, the wrench 10 comprises a housing 11, a motor 12 for driving an output spindle 13 by means of an impact clutch mechanism (not shown), a pistol-grip handle 14 having a rocker-type of reversing trigger 15, and a pair of brush holder assemblies, one of which is designated generally as to 16.

With reference to FIG. 2, the brush holder assembly includes a body portion 17, a brush 18 engaging a drum-type commutator 19, and a brush lead 20. The body portion has a protruding shoulder 21 engaged by a ledge 22 on an end cap 23, thereby suitably securing the brush holder assembly within the housing when the end cap is secured to the housing.

With reference to FIG. 3, the body portion is preferably molded from a suitable insulating material and has a through opening 24 formed therein, one end of which is internally threaded as at 25. An externally-accessible lateral opening 26 communicates with the through opening (in the direction of the protruding shoulder 21) and forms an internal shoulder 27 within the body portion. A brush insert 28, preferably formed of bent sheet metal, is slidably received within the body portion 17. The insert is formed with an integral connecting tab 29, slidably received within a slot 30 in the body (as shown in FIG. 3). The tab 29 is bent away from the insert within the lateral opening 26 and over against the internal shoulder 27 (as shown in FIG. 4) to prevent axial withdrawal of the insert in one direction from the body.

With reference to FIG. 7, the inner end of the insert is covered by a shunt cap 31, and a shunt 32 is disposed between the shunt cap and the brush. A spring 33 is seated on a pilot portion 34 of the brush, between the brush and the shunt cap, and within the insert. This spring constantly urges the brush against the commutator as shown in FIG. 2. Adjacent to the shunt cap, the insert has a pair of laterally-projecting ears 35, as shown in FIG. 7, which engage a ledge 36 on the body and preclude axial movement of the insert with respect to the body in a direction towards the commutator. Together with the tab 29 and internal shoulder 27, the ears 35 secure the insert with respect to the body portion of the brush holder assembly.

With reference again to FIG. 7, and with further reference to FIGS. 8 and 9, a removable brush cap 37 has external threads 38 engaging the internal threads formed in the body portion. The brush cap is provided with a kerf or slot 39 for facilitating removal of the brush cap from the body. A conical spring 40, as shown in plan view in FIG. 10, is lodged between the brush cap and the shunt cap to bias the shunt cap against the inner end of the brush insert. The enlarged coil portion 41 of the conical spring is seated in a blind axial bore 42, and the center portion 43 of the conical spring bears against the shunt cap.

The brush lead 20 has a quick-connection terminal 44, sometimes referred to in the art as a "fast on" terminal, which is slidably received over the integral connection tab 29 within the lateral opening 26 of the body portion of the brush holder, as shown in FIG. 2.

With the construction of the present invention, the following benefits and advantages are realized:

1. The overall brush holder assembly has good vibration resistance and is well suited for use in the electric impace wrench 10 or in other environments where mechanical loads and vibration are prevalent.

2. The electrical connection between the tab 29 and terminal 44 may be made prior to assembly of the brush holder within the housing, thereby saving assembly time and reducing costs.

3. The electrical connection is made within the confines of the brush holder assembly (within the lateral opening 26) and thus is more resistant to dirt and other contaminants.

4. The brush cap 37 clamps the shunt cap 31 against the metal insert 28 in the normal manner to establish electrical connection, while the conical spring 40 serves a twofold purpose: one, to maintain tension on the brush cap and preclude it from becoming loose due to vibration; and two, to bias the shunt cap against the insert.

5. Since a conical spring 40 is used (between the brush cap and shunt cap) the enlarged end coil portion of the conical spring may be snapped radially into the cap. As a result, the conical spring is held securely to the brush cap, and will not become lost upon removal of the brush cap to replace the brush. Additionally, the center portion of the conical spring contacts the shunt cap near its center, thereby minimizing any torque or turning movement as the brush cap is threadably received within the body portion of the brush holder.

6. A simple round disc may be used for the shunt cap (as opposed to a cap with ears) so as to simplify assembly procedures and further reduce costs.

7. The overall brush holder assembly is easier to assemble and to service, hence is lower in cost, yet is reliable in the vibratory environment of an industrial application, such as a portable electric impact wrench.

Obviously, many modifications may be made without departing from the basic spirit of the present invention. Accordingly, it will be appreciated that within the scope of the appended claims, the invention may be practiced other than has been specifically described herein.

I claim:

1. A brush holder assembly, comprising: an insulating body portion having an inner end and an outer end and further having a through opening internally threaded at its outer end, the body portion further having an externally-accessible lateral opening communicating with the through opening, an internal shoulder within the body portion adjacent to the lateral opening, a conductive brush insert slidably received within the through opening and having an integrally-formed connecting tab received within the lateral opening and bent over the internal shoulder, thereby precluding axial withdrawal of the insert in one direction away from the body, a brush lead, a quick-connection electrical terminal on one end of the lead, the terminal being slidably received over the tab to make electrical connection to the insert, the connection being disposed substantially within the lateral opening, thereby tending to protect against dirt and contaminants, the brush insert having a longitudinal passageway formed therein, a brush slidably received in the passageway and extending beyond one end of the insert, a shunt cap over the other end of the insert, a shunt between the shunt cap and the brush, an externally-threaded brush cap received within the internally-threaded outer end of the body, the brush cap having an internal blind axial bore formed therein, and a conical biasing spring between the brush cap and the shunt cap, the conical spring having an enlarged end coil portion seated in the blind axial bore of the brush cap, and further having a center portion bearing against the shunt cap, thereby tending to minimize turning movement of the shunt cap as the brush cap is threadably received within the body.

2. In a brush holder assembly, the combination of an insulating body portion having a through opening internally threaded at one end thereof, a conductive brush insert secured within the body and having a longitudinal passageway, a brush slidably received within the passageway and extended beyond one end of the insert, a shunt cap over the other end of the insert, a shunt between the brush and the shunt cap, an externally threaded insulating brush cap secured within the body portion of the assembly, a conical biasing spring between the brush cap and the shunt cap, the spring having a center portion and an enlarged end coil portion, and the center portion bearing against the shunt cap, whereby turning torques are minimized as the brush cap is threadably received within the body.

3. The brush holder assembly of claim 2, wherein the brush cap has a blind axial bore, and the enlarged end coil portion of the conical spring is seated in the bore.

* * * * *